(12) United States Patent
Yanagawa et al.

(10) Patent No.: US 9,915,292 B2
(45) Date of Patent: Mar. 13, 2018

(54) TRIPOD TYPE CONSTANT-VELOCITY JOINT

(71) Applicant: NTN CORPORATION, Osaka (JP)

(72) Inventors: Hiroshi Yanagawa, Mie (JP); Kazuo Hirose, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/787,486

(22) PCT Filed: Apr. 25, 2014

(86) PCT No.: PCT/JP2014/061688
§ 371 (c)(1),
(2) Date: Oct. 28, 2015

(87) PCT Pub. No.: WO2014/178344
PCT Pub. Date: Nov. 6, 2014

(65) Prior Publication Data
US 2016/0102714 A1    Apr. 14, 2016

(30) Foreign Application Priority Data

Apr. 30, 2013 (JP) .................................. 2013-094947
Mar. 20, 2014 (JP) .................................. 2014-058249

(51) Int. Cl.
*F16D 3/205*    (2006.01)

(52) U.S. Cl.
CPC ......... *F16D 3/2055* (2013.01); *Y10S 464/905* (2013.01)

(58) Field of Classification Search
CPC ........................... F16D 3/2055; Y10S 464/905
(Continued)

(56) References Cited

U.S. PATENT DOCUMENTS 3,613,396 A * 10/1971 Drevard et al. ........ F16D 3/202
                                                                464/111
4,036,031 A *  7/1977 Woodling ................ F16D 3/20
                                                                464/155 X
(Continued)

FOREIGN PATENT DOCUMENTS

CN      102439326       5/2012
EP      1 788 267       5/2007
(Continued)

OTHER PUBLICATIONS

International Search Report dated Jul. 22, 2014 in International (PCT) Application No. PCT/JP2014/061688.
(Continued)

*Primary Examiner* — Gregory J Binda
(74) *Attorney, Agent, or Firm* — Wenderoth, Lind & Ponack, L.L.P.

(57) ABSTRACT

A drawer pull-out guide includes a carcass rail to be fixed to a furniture carcass, an extension rail displaceable relative to the carcass rail between a closed position and an open position, and a rolling body and a supporting body movable along a running limb of the carcass rail and a running surface of the extension rail upon a movement of the extension rail. A clearance is formed on the running limb of the carcass rail and/or on the running surface of the extension rail. The rolling body is accommodated within the clearance in the closed position of the extension rail and is thereby relieved from the load of the extension rail. In the closed position of the extension rail, the load of the extension rail is carried by the rolling body. The rolling body and the supporting body are arranged in a common running carriage.

7 Claims, 4 Drawing Sheets

(58) Field of Classification Search
USPC ......... 464/102, 104, 111, 114–116, 155, 905
See application file for complete search history.

(56) References Cited

U.S. PATENT DOCUMENTS

| | | | |
|---|---|---|---|
| 4,610,327 A | 9/1986 | Orain | |
| 5,951,401 A | 9/1999 | Kita et al. | |
| 7,289,752 B2 * | 10/2007 | Yamazaki | G03G 15/757 464/111 X |
| 9,367,018 B1 * | 6/2016 | Yanagawa | G03G 15/757 |
| 2005/0014565 A1 | 1/2005 | Itagaki et al. | |

FOREIGN PATENT DOCUMENTS

| | | |
|---|---|---|
| JP | 53-034043 | 3/1978 |
| JP | 60-60036 | 4/1985 |
| JP | 09-112565 | 5/1997 |
| JP | 2007-139084 | 6/2007 |
| JP | 2007-255511 | 10/2007 |
| JP | 2010-242780 | 10/2010 |
| JP | 2010-281341 | 12/2010 |

OTHER PUBLICATIONS

Written Opinion of the International Searching Authority dated Jul. 22, 2014 in International (PCT) Application No. PCT/JP2014/061688 (with English translation).
The First Office Action dated Apr. 27, 2017 in corresponding Chinese Application No. 201480024223.X, with English translation.

* cited by examiner

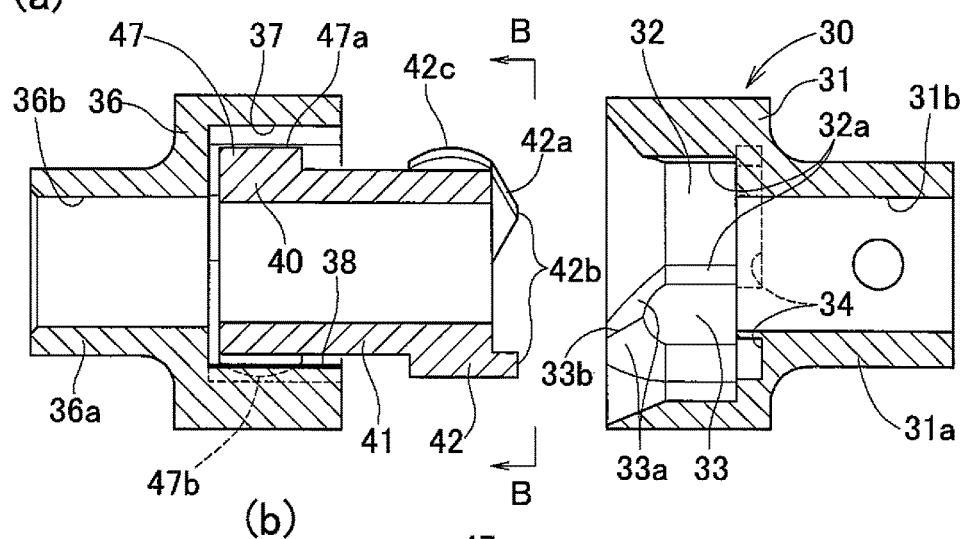
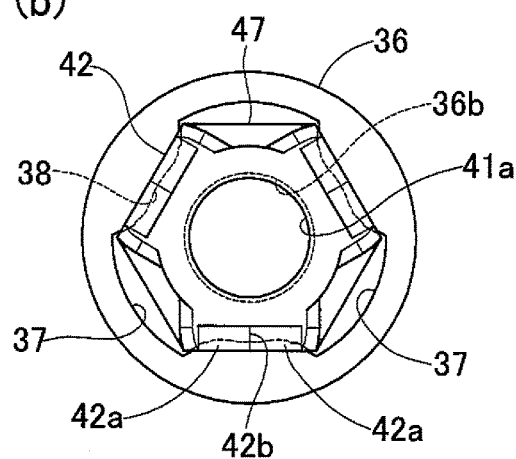
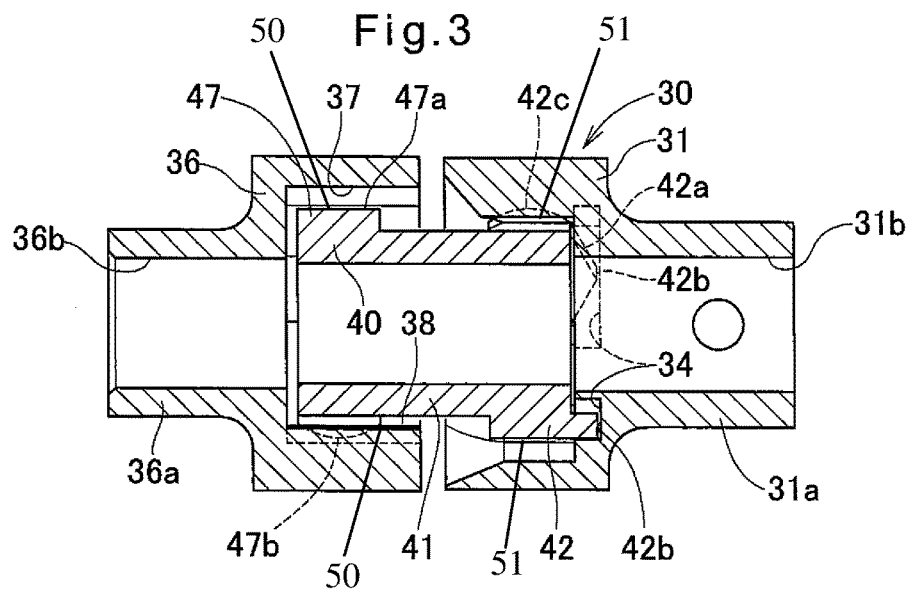

Fig.5
(a)
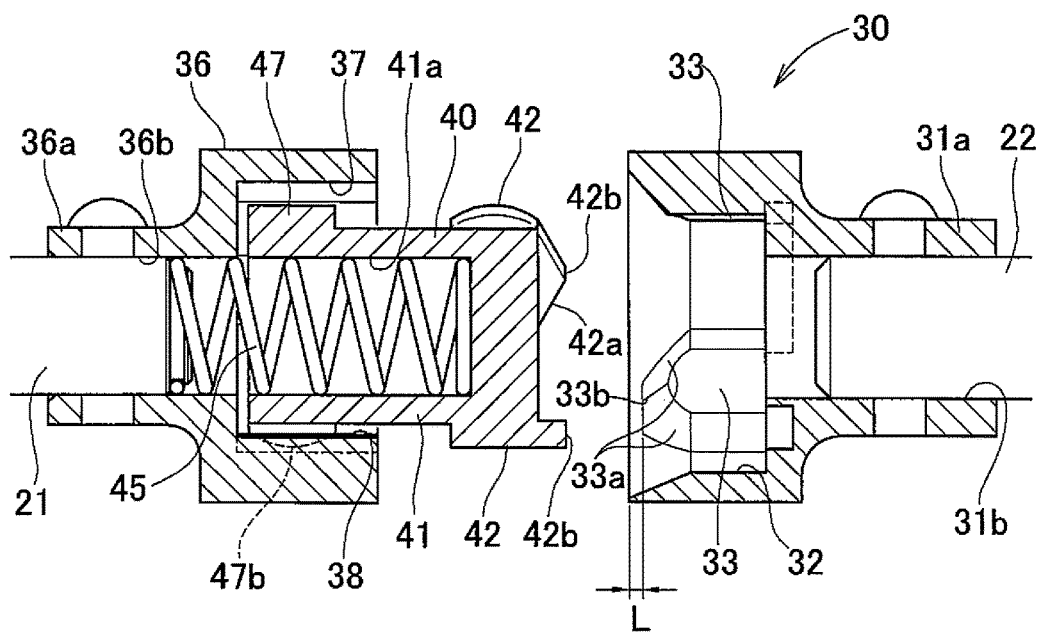
(b)
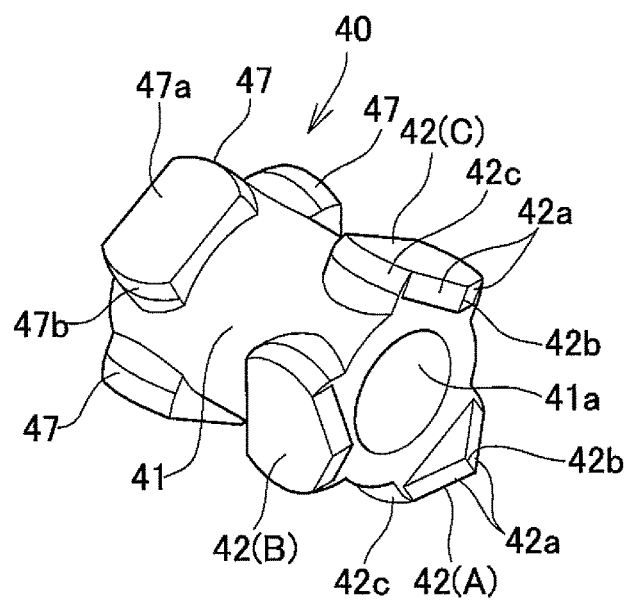

TRIPOD TYPE CONSTANT-VELOCITY JOINT

TECHNICAL FIELD

This invention relates to a constant-velocity joint through which a driving shaft and a driven shaft are coupled together such that power of the driving shaft is transmitted to the driven shaft.

BACKGROUND ART

Constant-velocity joints have been used to transmit torque of a vehicle drive shaft to an axle.

Since constant-velocity joints allow angular displacement between the driving shaft and the driven shaft with the two shafts rotating at constant speeds, they are being used not only in motor vehicles but also in various industrial machines, home appliances, office machines, etc.

There are two types of constant-velocity joints, namely, fixed constant-velocity joints, which only permit angular displacement, and sliding constant-velocity joints, which permit both angular and axial displacements. JP Patent Publication 2007-255511A discloses a sliding constant-velocity joint.

The constant-velocity joint disclosed in JP Patent Publication 2007-255511A is what is known as a tripod type constant-velocity joint, and includes an outer ring formed on the inner periphery thereof with three axially extending track grooves so as to be circumferentially spaced apart by 120 degrees from each other, and a tripod member mounted inside the outer and formed with three radial protrusions (trunnions) slidably inserted in the respective track groove, whereby torque is transmitted between the outer ring and the tripod member.

The outer ring has bulges between respective adjacent pairs of track grooves. Each of the bulges is formed at its distal end with a pair of tapered surfaces inclined in opposite directions to each other and defining an apex at the center of the bulge with respect to its width direction. Each protrusion is formed at its front portion with a pair of tapered surfaces inclined from the widthwise center toward both sides, of the protrusion, thereby defining an apex at the widthwise center of the protrusion, whereby the tripod member can be easily fitted in and removed from the outer ring.

The tripod type constant-velocity joint disclosed in JP Patent Publication 2007-255511A is advantageous in that the tripod member can be easily fitted in and removed from the outer ring, no grease lubrication is necessary, and it is lightweight and small in size, and produces less noise.

The constant-velocity joint disclosed in JP Patent Publication 2007-255511A allows the axis of the driving shaft and the axis of the driven shaft to be inclined relative to each other with a relatively large angle therebetween, provided the two axes intersect each other in or near the joint.

However, this constant-velocity joint does not allow the above two axes to be inclined relative to each other with a relatively large angle, if the above two axes intersect each other at a position remote from the joint. Also, this constant-velocity joint does not allow too large an offset between the above two axes if the axes are parallel to each other.

SUMMARY OF THE INVENTION

An object of the present invention is to minimize fluctuations in the rotational speed of the driving and driven shafts, and to allow a large inclination angle between the axes of the driving and driven shafts, as well as a large offset between these axes.

In order to achieve this object, the present invention provides a tripod type constant-velocity joint through which a driving shaft is coupled to a driven shaft such that rotation of the driving shaft is transmitted to the driven shaft through the joint. The joint is configured to reduce fluctuations in rotational speed of the driven shaft when the axis of the driving shaft and the axis of the driven shaft form an angle other than 180 degrees, or when the axis of the driving shaft and the axis of the driven shaft are out of alignment with each other.

The joint comprises two outer rings connected to the driving shaft and the driven shaft, respectively, and a tripod member through which the outer rings are coupled together. Each of the outer rings has an inner periphery formed with three axially extending track grooves arranged at angular intervals of 120 degrees. The tripod member has two axial ends each formed with three protrusions axially slidably received in the respective track grooves of a corresponding one of the outer rings, whereby torque around an axis is transmitted between the respective outer rings and the tripod member.

Since the tripod type constant-velocity joint, through which a driving shaft is coupled to a driven shaft, comprises a pair of outer rings each formed with three track grooves, and a tripod member having at each end thereof three protrusions inserted in the respective track grooves of the corresponding outer ring, and is configured such that the joint can be bent and swivel at both ends of the tripod member. The driven shaft can be rotated at a constant speed even when the driving and driven shafts are inclined relative to each other at a large angle or offset from each other.

In the above arrangement, the tripod member and the outer rings may be formed of a synthetic resin or resins. In this case, the main component (base resin) of the synthetic resin forming the tripod member is preferably different from the main component of the synthetic resin forming the outer rings.

By forming the tripod member and the outer rings from synthetic resin, it is possible to eliminate the need for lubricant such as grease, and thus to eliminate the need for a member for preventing leakage of lubricant, such as a boot. Also, it is possible to simplify maintenance. Since no lubricant is used, there is no possibility of peripheral devices being contaminated by leaked lubricant. Noises while torque is being transmitted decrease, too. In the arrangement in which the main component (base resin) of the synthetic resin forming the tripod member is different from the main component of the synthetic resin forming the outer rings, it is possible to prevent adhesion of the resins, which reduces torque fluctuations and improves wear properties.

In any of these arrangements, the three protrusions at one of the two axial ends of the tripod member are connected to one of the outer rings so as to be more easily separable from the one of the outer rings than the three protrusions at the other of the two axial ends of the tripod member are separable from the other of the outer rings.

In a device using a constant-velocity joint, it may become necessary to connect together driving and driven shafts through the joint (so that driving force is transmitted from the driving shaft to the driven shaft) and disconnect them from each other (so that driving force is not transmitted), for the purpose of maintenance or to replace deteriorated parts.

In such a case, by configuring the joint such that one of the two axial ends of the tripod member is more easily disconnected from the corresponding outer ring than is the other axial end from the corresponding outer ring, the driving shaft can be disconnected from the driven shaft always at the same point of the joint. In particular, when the driving and driven shafts are pulled away from each other, the protrusions at the one of the axial ends of the tripod member separate from the corresponding track grooves, so that the one of the axial ends of the tripod member is spontaneously disconnected from the corresponding outer ring. By pushing the driving and driven shafts toward each other, the above-mentioned protrusions are inserted into the track grooves, so that the one of the axial ends of the tripod member is spontaneously connected to the outer ring. This is possible because the protrusions are axially movable relative to the track grooves.

In order to make one of the axial ends of the tripod member more easily separable from the corresponding outer ring than is the other axial end from the corresponding outer ring, an anti-separation element such as a snap ring may be provided between the other axial end of the tripod member and the corresponding outer ring, which is fixed. Alternatively, radially inwardly extending protrusions or undercuts may be formed at the open end of the fixed outer ring, to reduce the opening (i.e., create contact or a much smaller gap between the tripod member and the fixed outer ring at locations where protrusions/undercuts are located). Still alternatively, the track grooves and/or protrusions may be formed so that the gap formed between the tripod member and the fixed outer ring when the former is fitted into the latter may be narrower than a gap formed between the tripod member and the unfixed outer ring when the former is fitted into the latter, whereby when an axial pulling force is applied, the tripod member is separable more easily from the unfixed outer ring than from the fixed outer ring.

In order that the protrusions at the one of the axial ends of the tripod member are smoothly fitted into the track grooves when the tripod member is connected at the one of the axial ends thereof to the corresponding outer ring, the outer ring may be provided with guide functions near the entrances of the track grooves.

In particular, as the guide functions, at a portion where the three protrusions at one of the axial ends of the tripod member are connected to one of the outer rings, the one of the outer rings is formed with three bulges between the respective adjacent pairs of the track grooves of the one of the outer rings. Each of the bulges is formed at the distal end portion thereof with a pair of tapered surfaces inclined in circumferentially opposite directions to each other, and an apex is defined between the tapered surfaces at substantially the central portion of the bulge with respect to the circumferential direction of the one of the outer rings. Each of the protrusions at the one of the axial ends of the tripod member is formed on a front surface thereof with a pair of tapered surfaces extending from substantially the widthwise central portion of the protrusion toward two sides of the protrusion, respectively, thereby defining an apex at substantially the widthwise central portion of the protrusion.

With this arrangement, when the tripod member is inserted into the unfixed outer ring through its open end, even if the track grooves are circumferentially displaced from the protrusions, the protrusions are guided by, while kept in contact with, the tapered surfaces formed at the distal ends of the bulges, to the openings of the track grooves at their distal ends. This eliminates the necessity to align the track grooves with the protrusions, thus making connection of the tripod type constant-velocity joint extremely easy.

In this arrangement, the apex of at least one of the three bulges of the one of the outer rings is located at an axial position different from the axial positions of the apexes of the other two bulges. It is particularly preferable that the apex of at least one of the three bulges be located forwardly of the apexes of the other two of bulges.

Alternatively, the apex of at least one of the three protrusions at the one of the axial ends of the tripod member may be located at an axial position different from the axial positions of the apexes of the other two protrusions. It is particularly preferable that the apex of at least one of the three protrusions at the one of the axial ends of the tripod member be located forwardly of the apexes of the other two protrusions.

If, for example, the apexes of the three bulges of the outer ring are at the same position with respect to the axial direction of the outer ring, if the apexes of the protrusions are at the same position with respect to the axial direction of the outer ring when the joint is assembled, the tripod member and outer ring will be supported by each other at three points if the apexes of the bulges are at the same circumferential positions as the apexes of the corresponding three protrusions of the tripod member. This makes it impossible for the tapered surfaces to guide the apexes, and also could damage the apexes if a larger-than-expected pushing force is applied. To avoid these problems, the apexes are preferably arranged in one of the above-described manners.

In any of the above arrangements, each protrusion may have two side surfaces curved along the axial direction of the tripod member and facing, and kept in contact with, the respective side surfaces of the corresponding one of the track grooves. Since the curved side surfaces of the protrusions are in contact with the side surfaces of the track grooves, the tripod member can be smoothly inclined and swiveled relative to the outer rings when the driving and driven shafts are inclined relative to each other or offset from each other.

ADVANTAGES OF THE INVENTION

Since the constant-velocity joint according to the present invention, for coupling together driving and driven shafts, comprises a pair of outer rings each having three track grooves, and a tripod member having three protrusions received in the track grooves of one of the outer rings, and additional three protrusions received in the track grooves of the other of the outer rings such that the tripod member is capable of swiveling and bending at the two ends of the tripod member, this joint allows the driven shaft to be rotated at a constant speed even if the inclination angle and/or the offset between the driving and driven shafts is large.

BRIEF DESCRIPTION OF THE DRAWINGS

FIGS. 2(a) and 2(b) show components forming the tripod type constant-velocity joint in a detailed manner, of which FIG. 2(a) is a sectional view of a pair of outer rings; and FIG. 2(b) is a sectional view taken along the arrowed line B-B of FIG. 2(a).

FIG. 3 is a sectional view of the tripod type constant-velocity joint.

FIGS. 5(a) and 5(b) show modifications of the tripod type constant-velocity joint, of which FIG. 5(a) is a sectional view of a coupling means; and FIG. 5(b) is a perspective view of a tripod member.

DETAILED DESCRIPTION OF THE INVENTION

Figure 1:
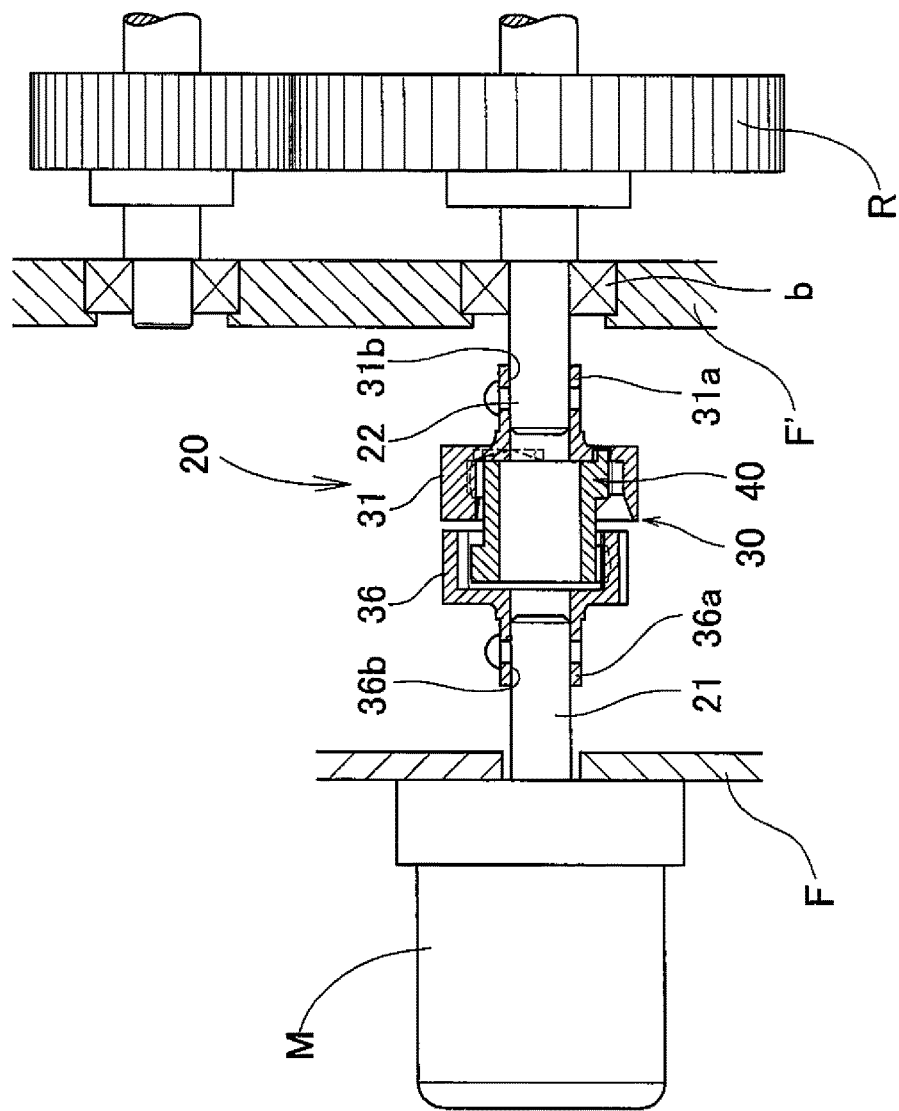
FIG. 1 is a partial enlarged view of a device which uses a tripod type constant-velocity joint embodying the present invention.

An embodiment of the present invention is now described with reference to the drawings. FIG. 1 shows a portion of a rotation transmission mechanism including a tripod type constant-velocity joint according to the present invention.

The rotation transmission mechanism includes a rotary portion R including gears through which driving force is transmitted, a driving source M configured to rotate the rotary portion R about the axis of the rotary portion R, and a driving force transmitting device 20 through which driving force is transmitted from the driving source M to the rotary portion R.

Figure 4:
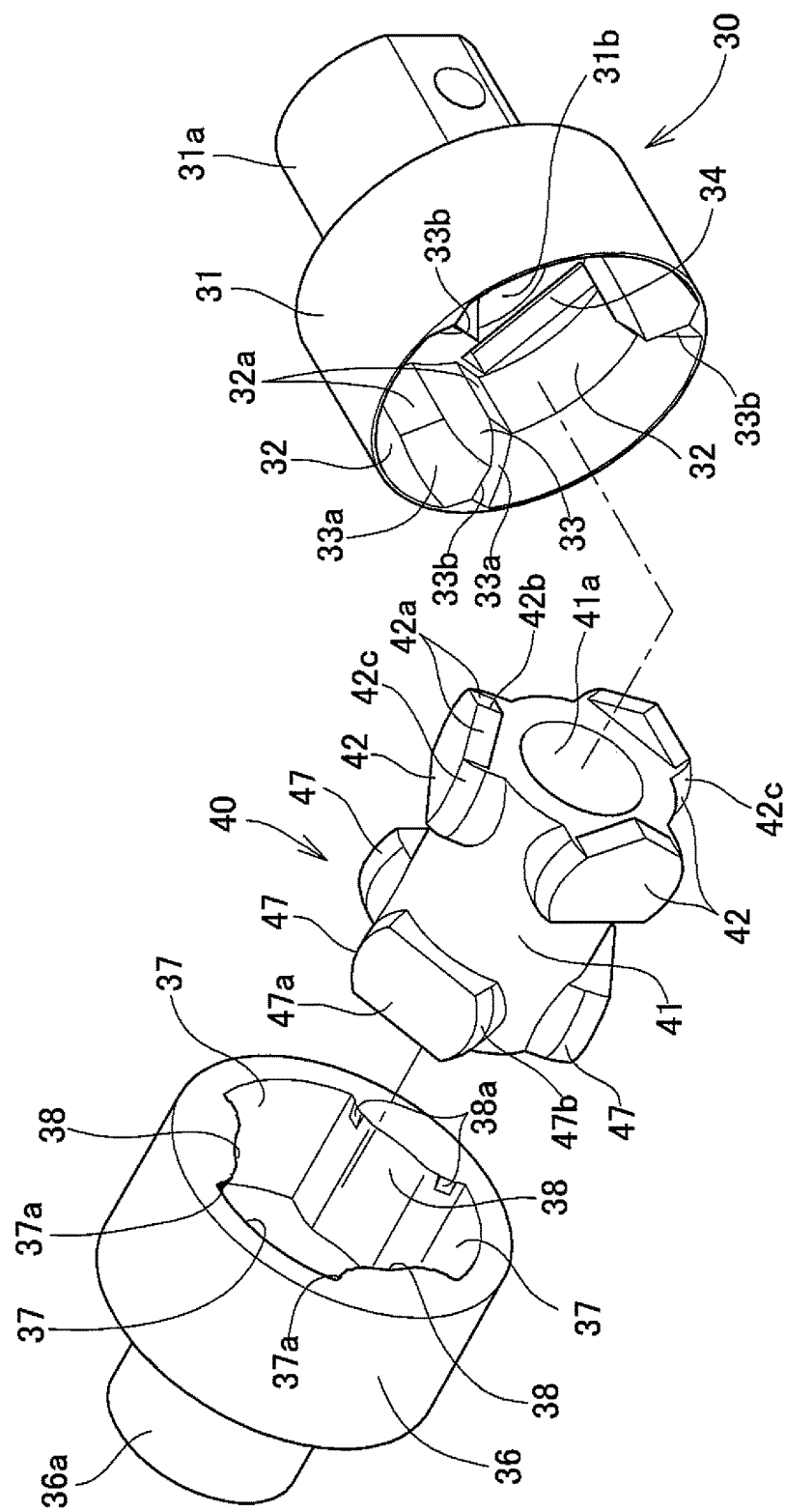
FIG. 4 is an exploded perspective view of the tripod type constant-velocity joint.

The driving force transmitting device 20 includes a coupling 30 comprising a tripod type constant-velocity joint through which a driving shaft 21 extending from the driving source M is coupled to driven shafts 22 (which is hereinafter referred to as "rotary member shafts 22") extending from the rotary portion R. The coupling 30 is configured such that when the center axis of the rotary member shafts 22 is not aligned with the center axis of the driving shaft 21, that is, when the angle therebetween is not 180 degrees, or while the center axes are offset from each other, the rotation of the driving shaft 21 can be transmitted to the rotary member shafts 22 through the coupling 30 while minimizing fluctuations in the rotational speed of the rotary member shafts 22. FIGS. 2 to 4 show the detailed structure of the coupling 30. FIGS. 5(a) and 5(b) show respective modifications of the coupling 30 shown in FIGS. 2 to 4.

As shown in FIG. 1, the rotary member shafts 22 are provided at the respective ends of the rotary portion R, and are respectively supported by a pair of frames F' through bearings b so as to be rotatable about the axis of the rotary member shafts 22. The driving source M for driving the rotary portion R is mounted to a frame F on the side of the body of the rotation transmission mechanism so as to axially face the rotary portion R. The frames F' are movable in the axial direction of the rotary member shafts 22 along the rotary member shafts 22, toward and away from the frame F, such that the unit including the rotary portion R can be mounted to and detached from the body of the rotation transmission mechanism.

The coupling 30 couples the driving shaft 21 of the driving source M to one of the rotary member shafts 22 of the rotary portion R, and includes a pair of outer rings 31 and 36, and a tripod member 40 through which the outer rings 31 and 36 are coupled together. The tripod member 40 and the outer rings 31 and 36 are all formed of a synthetic resin or resins, and an optimum one or ones are selected as the synthetic resin or resins according to the use conditions of the tripod type constant-velocity joint 30. Such a synthetic resin or resins are preferably either a thermoplastic or thermosetting injection-moldable synthetic resin or resins.

By using a synthetic resin for the pair of outer rings 31 and 36 whose main component not including additives (base resin) is different from the base resin of the synthetic resin forming the tripod member 40, it is possible to prevent adhesion. Preferably, the main components of the synthetic resins forming the outer rings 31 and 36 both differ from the main component of the synthetic resin forming the tripod member 40. With this arrangement, it is possible to prevent fluctuations in torque and improve wear resistance. By way of example, the outer rings 31 and 36 may be made of nylon resin, while the tripod member 40 may be made of polyphenylene sulfide (PPS) resin.

Each of the outer rings 31 and 36 is a cup-shaped member having an open end and including a shaft portion 31a or 36a at the closed end thereof. Each of the outer rings 31 and 36 has on its inner periphery three track grooves 32 or 37 arranged at angular intervals of 120 degrees. Each of the track grooves 32 and 37 has a circumferentially opposed pair of side surfaces 32a or 37a which are flat surfaces extending parallel to each other.

The tripod member 40 includes a shaft-shaped main body 41 formed with three protrusions 42 at one axial end of the main body 41, and three protrusions 47 at the other axial end of the main body 41. The three protrusions 42 are received in the respective track grooves 32 of the outer ring 31, while the three protrusions 47 are received in the respective track grooves 37 of the outer ring 36. The protrusions 42 are configured such that their distal ends are received in recesses 34 formed in the deeper ends of the respective track grooves 32 of the outer ring 31.

The protrusions 42 and 47 are axially slidable in the respective track grooves 32 and 37. Each of the protrusions 42 and 47 has two side surfaces 42c or 47b facing the respective side surfaces 32a or 37a of the corresponding track groove 32 or 37. The side surfaces 42c and 47b are cylindrical surfaces curved along the axial direction of the tripod member 40. In this embodiment, the opposed cylindrical side surfaces of each protrusion have a center axis extending in the radial direction of the tripod member and coinciding with the axis of the protrusion 42, 47 in the protruding direction of the protrusion. However, instead of such cylindrical side surfaces, the protrusions may have spherical side surfaces.

The protrusions 42 and 47 are configured such that when turning torque is applied to the driving shaft 21 or the rotary member shafts 22, the side surfaces 42c and 47b engage the respective side surfaces 32a and 37a of the track grooves 32 and 37, whereby turning torque around the axis is transmitted between the outer rings 31 and 36 and the tripod member 40.

In this state, when the axes of the rotary member shafts and the driving shaft are inclined relative to each other or offset from each other, the side surfaces 32a and 37a of the truck grooves 32 and 37 slide on the opposed side surfaces 42c and 47b of the protrusions 42 and 47, thereby allowing the outer rings 31 and 36 and the tripod member 40 to be smoothly inclined or swiveled relative to each other.

The coupling 30 is configured such that the outer ring 31 is more easily separable axially from the corresponding three protrusions 42 (i.e. the protrusions at the axial end of the tripod member 40 closest to the side of the rotary portion R) than is the outer ring 36 from the corresponding three protrusions 47 (i.e. the protrusions at the axial end of the tripod member 40 closest to the side of the driving source M).

For this purpose, in the embodiment as shown in FIGS. 2(a), 2(b), and 3, the coupling 30 is configured such that a relatively small radial gap 50 is created between the tripod member 40 and the fixed first outer ring 36 on the side of the driving source M when the tripod member 40 is fitted into the first outer ring 36 such that the former is press-fitted into the latter, and thus the tripod member 40 is more difficult to be disconnected from the outer ring 36. The coupling 30 is further configured such that a relatively large radial gap 51 is created between the tripod member 40 and the unfixed second outer ring 31 on the side of the rotary portion R when the tripod member 40 is fitted into the second outer ring 31 such that the tripod member 40 can be fitted into the outer ring 31 with a relatively weak force. In other words, the radial gap between the tripod member 40 and the first outer ring 36 is smaller than the radial gap between the tripod member 40 and the second outer ring 31. With this arrangement, when an axial pulling force is applied to the coupling 30, the unfixed second outer ring 31 is more easily separable from the tripod member 40 than is the fixed first outer ring 36.

Preferably, as in the embodiment, the outer ring 36 on the side of the driving source M is fixed, and the outer ring 31 on the side of the rotary portion R is not fixed. However, the first outer ring 36 may be not fixed and the second outer ring 31 may be fixed.

As another means for making one of the axial ends of the tripod member 40 more easily separable from the corresponding outer ring than is the other axial end of the tripod member, an anti-separation element such as a snap ring may be provided between the fixed outer ring and the tripod member 40. In particular, a snap ring having opposed circumferential ends, namely, a C-shaped snap ring may be fitted in an engaging groove formed in the inner periphery of the fixed outer ring. The snap ring prevents the tripod member from being pulled out of the fixed outer ring through its open end. As still another such means, radially inwardly extending protrusions or undercuts (38a in FIG. 4) may be formed on the track grooves of the fixed outer ring near their open ends, thereby narrowing the opening of the outer ring.

The unfixed second outer ring 31 has bulges 33 formed between the respective adjacent track grooves 32. Each bulge 33 has a pair of tapered surfaces 33a formed at its distal end (end facing the opening of the outer ring 31) so as to be inclined in circumferentially opposite directions to each other, thereby defining an apex 33b at substantially the central portion of the bulge 33 with respect to its circumferential width. The apex 33b is in the form of a straight ridgeline extending in the radial direction of the outer ring 31.

The fixed first outer ring 36 also has bulges 38 formed between the respective adjacent track grooves 37. However, since the outer ring 36 is not frequently disconnected from the tripod member, the bulges 38 are not formed with the tapered surfaces and apexes.

The three protrusions 42, which are formed at the end of the tripod member 40 connected to the unfixed outer ring 31, are each formed on its front surface with a pair of tapered surfaces 42a inclined from the widthwise center of the protrusion 42 toward both sides thereof, thereby defining an apex 42b at substantially the central portion of the protrusion 42 with respect to its circumferential width. The apex 42b is in the form of a straight ridgeline extending in the radial direction of the tripod member 40.

In this transmission mechanism, it is now supposed that the body of the unit including the rotary portion R is not supported at a correct position. In such a state, the axis of the rotary member shafts 22 of the rotary portion R and the axis of the driving shaft 21 of the driving source M are displaced from each other in the vertical direction and/or horizontal direction, and thus are not aligned with each other, and/or inclined relative to each other.

When torque is transmitted in this state, at the portions of the tripod member connected to the fixed and unfixed outer rings, the protrusions 42 and 47 slide in the respective track grooves 32 and 37 in the axial directions of the outer rings 31 and 36. In this state, since the side surfaces 42c and 47b of the protrusions 42 and 47 are in line contact (or in point contact, if the side surfaces 42c and 47b are spherical surfaces) with the side surfaces 32a and 37a of the track grooves 32 and 37, the resistance therebetween is small, so that the protrusions 42 and 47 can smoothly slide along the track grooves 32 and 37.

Since the tripod member 40 can be inclined and swiveled relative to the outer rings at two locations, namely at the two end portions thereof, the coupling enables the rotary portion R to be rotated at a constant speed, i.e. without fluctuation in rotational speed, even if the rotary member shafts 22 and the driving shaft 21 are out of alignment with each other, and/or inclined relative to each other, to a considerable degree.

FIGS. 5(a) and 5(b) show a modified example. In the embodiment, the apexes 33b of the three bulges 33 of the unfixed outer ring 31 are all at the same position with respect to the axial direction of the outer ring 31, and the apexes 42b of the three protrusions 42 of the tripod member 40, which correspond to the three bulges 33, are also all at the same position with respect to the axial direction of the tripod member 40.

When assembling together the outer ring 31 and the tripod member 40, each of the apexes 42b of the protrusions 42, which are arranged at angular intervals of 120 degrees around the axis of the tripod member, are brought into contact with one of the tapered surfaces 33a on both sides of the apex 33b of the corresponding one of the bulges 33, which are also arranged at angular intervals of 120 degrees so that the apexes 42b are guided along the tapered surfaces 33a into the respective track grooves 32.

If, however, when the outer ring 31 and the tripod member 40 are assembled together, the apexes 33b of the bulges 33 are angularly aligned with the respective apexes 42b of the protrusions 42, the outer ring 31 is supported by the tripod member 40 at three points, so that not only can the apexes 42b not be guided along the tapered surfaces 33a, but also the apexes 33b and 42b, which are in abutment with each other, could be damaged if a larger-than-expected pushing force is applied. In order to prevent such three-point support, the coupling 30 may have any one of the following configurations.

In a first configuration, the apex 33b of at least one of the three bulges 33 of the outer ring 31 is positioned so as to be displaced in the axial direction from the apexes 33b of the other two bulges 33. With this arrangement, it is possible to prevent three-point support. There are the following three specific arrangements for preventing three-point support: arrangement in which two of the three apexes 33b are at the same axial position, and the remaining one of the apexes 33b is located axially forward of the first two of the three apexes 33b (toward the side of the open end of the outer ring 31); arrangement in which two of the three apexes 33b are at the same axial position, and the remaining one of the apexes 33b is located rearward of the first two of the apexes 33b (toward the side of the closed end of the outer ring 31); and arrangement in which each of the three apexes 33b is located at an axial position different from the axial positions of the other two of the apexes 33b. The apexes 42b of the three protrusions 42 of the tripod member 40 are arranged such that not all three of the apexes 42b simultaneously abut the respective apexes 33b of the bulges 33. For this purpose, the apexes 42b of the protrusions 42 may be located at the same axial position.

FIG. 5(a) shows the arrangement in which the apex 33b of one of the three bulges 33 is located forward of the apexes 33b of the other two bulges 33 by a distance L, with the other two apexes 33 at the same axial position. As indicated in FIG. 5(a), the term "forward" as used herein means a direction away from the open receiving end of the respective outer ring 31, 36. The apexes 42b of the three protrusions 42 of the tripod member 40 are all located at the same axial position. With this arrangement, it is possible to avoid three-point support between the apexes 33b and the apexes 42b.

In FIG. 5(a), in order to allow one of the two axial ends of the tripod member 40 to be more easily separable from the corresponding outer ring than is the other axial end from the corresponding outer ring, a coil spring 45 is disposed between the tripod member 40 and the fixed outer ring 36. In particular, the coil spring 45 has the respective ends thereof fitted in an axial hole 41a formed in the center of the tripod member 40 and in an axial hole 36b formed in the outer ring 36. The coil spring 45 thus supports the tripod member 40 and the outer ring 36 so as to be inseparable from each other. In this state, the tripod member 40 and the outer ring 36 can be inclined and swivel relative to each other, and are also coupled together so as to be inseparable from each other unless they are pulled in the axial direction with a relatively strong force. Thus, as with the above-described embodiments, when the outer rings 31 and 36 are pulled in the directions away from each other, the tripod member 40 is separated from only the second outer ring 31, and not from the first outer ring 36.

In a second configuration, the apex 42b of at least one of the three protrusions 42 of the tripod member 40 is positioned so as to be displaced in the axial direction from the apexes 42b of the other two protrusions 42. With this arrangement, it is possible to prevent three-point support. There are the following three specific arrangements for preventing three-point support: arrangement in which two of the three apexes 42b are at the same axial position, and the remaining one of the apexes 42b is located axially forward of the first two of the three apexes 42b (toward the side of the open end of the tripod member 40); arrangement in which two of the three apexes 42b are at the same axial position, and the remaining one of the apexes 42b is located rearward of the first two of the apexes 42b (toward the side of the closed end of the tripod member 40); and arrangement in which each of the three apexes 42b is located at an axial position different from the axial positions of the other two of the apexes 42b. The apexes 33b of the three bulges 33 of the outer ring 31 are arranged such that not all three of the apexes 33b simultaneously abut the respective apexes 42b of the protrusions 42. For this purpose, the apexes 33b of the bulges 33 may be located at the same axial position.

FIG. 5(b) shows the arrangement in which the apex 42b of one (indicated by the letter "A" in FIG. 5(b)) of the three protrusions 42 is located forwardly of the apexes 42b of the other two (indicated by the letters "B" and "C" in FIG. 5(b)) of the three protrusions 42, with the apexes 42b of the other two protrusions 42 at the same axial position. The apexes 33b of the three bulges 33 of outer ring 31 are all located at the same axial position. With this arrangement, it is possible to avoid three-point support between the apexes 33b and the apexes 42b.

In any of the embodiments, the rotary member shafts 22 of the rotary portion R including gears are connected to the driving shaft 21 of the driving source M through the tripod type constant-velocity (coupling) joint 30. However, the coupling 30, i.e. the tripod type constant-velocity joint, according to the present invention can be used to connect together driving and driven shafts of other members which have to be connected together such that the shafts can be rotated at a constant speed even if they are inclined relative to each other, and thus can be used in various industrial machines, home appliances, office machines, etc.

DESCRIPTION OF THE REFERENCE NUMERALS

21. Driving shaft
22. Driven shaft (rotary member shaft)
30. Tripod type constant-velocity joint
31, 36. Outer ring
31a, 36a. Shaft portion
31b, 36b, 41a. Axial hole
32, 37. Track groove
32a, 37a. Side surface
33, 38. Bulge
33a. Tapered surface
33b. Apex
34. Receiving recess
40. Tripod member
41. Main body
42, 47. Protrusion
42a. Tapered surface
42b. Apex
42c, 47b. Side surface
47a. Apex
R. Rotary portion
F, F'. Frame
M. Driving source (motor)

What is claimed is:

1. A tripod type constant-velocity joint through which a driving shaft is coupled to a driven shaft such that rotation of the driving shaft is transmitted to the driven shaft through the joint, wherein the joint is configured to reduce fluctuations in rotational speed of the driven shaft when an axis of the driving shaft and an axis of the driven shaft form an angle other than 180 degrees, or when the axis of the driving shaft and the axis of the driven shaft are out of alignment with each other, the joint comprising:
   a first outer ring to be connected to the driving shaft;
   a second outer ring to be connected to the driven shaft; and
   a tripod member coupling the first outer ring and the second outer ring together;
   wherein each of the first outer ring and the second outer ring has an inner periphery formed with three axially extending track grooves arranged at angular intervals of 120 degrees;
   wherein the tripod member has two axial ends each having three protrusions, each of the protrusions being configured to be axially slidably received in a respective one of the track grooves of a corresponding one of the first outer ring and the second outer ring, whereby torque around an axis is transmitted between the first outer ring, the second outer ring, and the tripod member;
   wherein a gap between the tripod member and one of first outer ring and the second outer ring is smaller than a gap between the tripod member and the other of the first outer ring and the second outer ring such that the tripod member is more easily separable from the other of the first outer ring and the second outer ring than from the one of the first outer ring and the second outer ring.

2. The tripod type constant-velocity joint of claim 1, wherein the tripod member is press-fit into the one of the first outer ring and the second outer ring.

3. The tripod type constant-velocity joint of claim 1, wherein the track grooves of the one of the first outer ring and the second outer ring have radially-inwardly extending protrusions.

4. A tripod type constant-velocity joint through which a driving shaft is coupled to a driven shaft such that rotation of the driving shaft is transmitted to the driven shaft through the joint, wherein the joint is configured to reduce fluctuations in rotational speed of the driven shaft when an axis of the driving shaft and an axis of the driven shaft form an angle other than 180 degrees, or when the axis of the driving shaft and the axis of the driven shaft are out of alignment with each other, the joint comprising:
- a first outer ring to be connected to the driving shaft;
- a second outer ring to be connected to the driven shaft;
- a tripod member coupling the first outer ring and the second outer ring together; and
- a coil spring having a first end fitted within an axial hole in an axial center of the tripod member, and having a second end fitted within an axial hole in one of the first outer ring and the second outer ring;
- wherein each of the first outer ring and the second outer ring has an inner periphery formed with three axially extending track grooves arranged at angular intervals of 120 degrees;
- wherein the tripod member has two axial ends each having three protrusions, each of the protrusions being configured to be axially slidably received in a respective one of the track grooves of a corresponding one of the first outer ring and the second outer ring, whereby torque around an axis is transmitted between the first outer ring, the second outer ring, and the tripod member.

5. A tripod type constant-velocity joint through which a driving shaft is coupled to a driven shaft such that rotation of the driving shaft is transmitted to the driven shaft through the joint, wherein the joint is configured to reduce fluctuations in rotational speed of the driven shaft when an axis of the driving shaft and an axis of the driven shaft form an angle other than 180 degrees, or when the axis of the driving shaft and the axis of the driven shaft are out of alignment with each other, the joint comprising:
- a first outer ring to be connected to the driving shaft;
- a second outer ring to be connected to the driven shaft; and
- a tripod member coupling the first outer ring and the second outer ring together;
- wherein each of the first outer ring and the second outer ring has an inner periphery formed with three axially extending track grooves arranged at angular intervals of 120 degrees;
- wherein the tripod member has two axial ends each having three protrusions, each of the protrusions being configured to be axially slidably received in a respective one of the track grooves of a corresponding one of the first outer ring and the second outer ring, whereby torque around an axis is transmitted between the first outer ring, the second outer ring, and the tripod member
- wherein each of the track grooves has two side surfaces, and each of the protrusions has two side surfaces curved along an axial direction of the tripod member, the two curved side surfaces of each of the protrusions being configured to face and keep in contact with respective side surfaces of a corresponding one of the track grooves.

6. A tripod type constant-velocity joint through which a driving shaft is coupled to a driven shaft such that rotation of the driving shaft is transmitted to the driven shaft through the joint, wherein the joint is configured to reduce fluctuations in rotational speed of the driven shaft when an axis of the driving shaft and an axis of the driven shaft form an angle other than 180 degrees, or when the axis of the driving shaft and the axis of the driven shaft are out of alignment with each other, the joint comprising:
- a first outer ring to be connected to the driving shaft;
- a second outer ring to be connected to the driven shaft; and
- a tripod member coupling the first outer ring and the second outer ring together;
- wherein each of the first outer ring and the second outer ring has an inner periphery formed with three axially extending track grooves arranged at angular intervals of 120 degrees;
- wherein the tripod member has two axial ends each having three protrusions, each of the protrusions being configured to be axially slidably received in a respective one of the track grooves of a corresponding one of the first outer ring and the second outer ring, whereby torque around an axis is transmitted between the first outer ring, the second outer ring, and the tripod member;
- wherein a first one of the first outer ring and the second outer ring is formed with three bulges, each of the three bulges being located between a respective adjacent pair of the track grooves of the first one of the first outer ring and the second outer ring, each of the bulges having a pair of tapered surfaces at a distal end portion thereof and inclined in circumferentially opposite directions to each other, the pair of tapered surfaces defining a bulge apex between the tapered surfaces at substantially a central portion of the respective bulge with respect to a circumferential direction of the first one of the first outer ring and the second outer ring, each of the protrusions at a first one of the axial ends of the tripod member corresponding to the first one of the first outer ring and the second outer ring having a pair of tapered surfaces on a front surface thereof and extending from substantially a widthwise central portion of the respective protrusion toward two sides of the respective protrusion thereby defining a protrusion apex at substantially the widthwise central portion of the respective protrusion; and
- wherein the protrusion apex of at least one of the three protrusions at the first one of the axial ends of the tripod member is located at an axial position different from axial positions of the protrusion apexes of the remaining protrusions at the first one of the axial ends of the tripod member.

7. The tripod type constant-velocity joint of claim 6, wherein the protrusion apex of the at least one of the three protrusions at the first one of the axial ends of the tripod member is located forward of the protrusion apexes of the remaining protrusions at the first one of the axial ends of the tripod member.

* * * * *